(12) United States Patent
Klosa (10) Patent No.: US 8,740,066 B2
(45) Date of Patent: Jun. 3, 2014

(54) AUTHORIZATION SYSTEM WITH A CARD AND A READER

(75) Inventor: Klaus Ulrich Klosa, Grüningen (CH)

(73) Assignee: Legic Identsystems AG (CH)

( * ) Notice: Subject to any disclaimer, the term of this patent is extended or adjusted under 35 U.S.C. 154(b) by 20 days.

(21) Appl. No.: 13/055,473

(22) PCT Filed: Aug. 17, 2009

(86) PCT No.: PCT/EP2009/005954
§ 371 (c)(1),
(2), (4) Date: Jan. 24, 2011

(87) PCT Pub. No.: WO2010/018000
PCT Pub. Date: Feb. 18, 2010

(65) Prior Publication Data
US 2011/0121072 A1 May 26, 2011

(30) Foreign Application Priority Data
Aug. 15, 2008 (EP) .................................. 08162479

(51) Int. Cl.
*G06K 5/00* (2006.01)
(52) U.S. Cl.
USPC ....................................................... 235/380
(58) Field of Classification Search
USPC .................. 340/5.8; 235/379–380
See application file for complete search history.

(56) References Cited

U.S. PATENT DOCUMENTS

| 5,449,894 | A | 9/1995 | Bruhnke et al. | |
|---|---|---|---|---|
| 7,350,230 | B2 * | 3/2008 | Forrest | 726/9 |
| 7,775,427 | B2 * | 8/2010 | Buer | 235/380 |
| 2004/0124966 | A1 * | 7/2004 | Forrest | 340/5.8 |
| 2005/0103839 | A1 | 5/2005 | Hewel | |
| 2006/0181396 | A1 * | 8/2006 | Uchida et al. | 340/10.51 |
| 2008/0076475 | A1 | 3/2008 | Kim | |
| 2009/0314831 | A1 * | 12/2009 | Pluss et al. | 235/375 |

FOREIGN PATENT DOCUMENTS

| DE | 10224209 | 12/2003 |
|---|---|---|
| DE | 102007045611 | 4/2008 |
| EP | 1873963 A1 | 1/2008 |
| EP | 1942470 A | 7/2008 |

(Continued)

OTHER PUBLICATIONS

International Search Report dated Dec. 18, 2009, issued in corresponding international application No. PCT/EP2009/005954.

*Primary Examiner* — Christle Marshall
(74) *Attorney, Agent, or Firm* — Ostrolenk Faber LLP (57) ABSTRACT

An authorization system (10) includes a reader (1) for a reader-card interaction (92) with a card (2), and a logic module configured to assign the reader (1) and the card (2) to each other and to make operable the reader-card interaction (92) based on authorization data comprising reader data and card data. The logic module is further configured to read via a non-contact interface (12.1) device data from an authorization storage device (5) and to assign the reader (1) to the card (2) based on the device data for making operable the reader-card interaction (92). The authorization storage device (5) is arranged spaced apart from the non-contact interface (12.1) at an essentially fixed distance (9), for example during the reader-device interaction (95). Using the device data makes it possible to enable efficiently the reader-card interaction (92) in case the reader data does not match the card data, for example.

16 Claims, 5 Drawing Sheets

(56) References Cited

FOREIGN PATENT DOCUMENTS

| WO | WO 97/34265 A1 | 9/1997 |
| WO | WO 02/05225 A1 | 1/2002 |
| WO | WO 02/069285 A | 9/2002 |
| WO | WO 2006/117009 A1 | 11/2006 |
| WO | WO 2008/034937 A1 | 3/2008 |

* cited by examiner

AUTHORIZATION SYSTEM WITH A CARD AND A READER

CROSS REFERENCE TO RELATED APPLICATIONS

The present application is a 35 U.S.C. §371 National Phase conversion of PCT/EP2009/005954, filed Aug. 17, 2009, which claims benefit of European Application No. 08162479.3, filed Aug. 15, 2008, the disclosure of which is incorporated herein by reference. The PCT International Application was published in the English language.

BACKGROUND

1. Field of the Disclosure

The present invention relates to an authorization system comprising a card and a reader) for a reader-card interaction, a method of assigning to each other the reader and the card for making operable the reader-card interaction, and a computer program product for use in the authorization system.

2. Related Art

From the applicant of this application known is an authorization system comprising at least one non-contact tag and a tag reader with a reader logic, e.g. a security module. The tag reader interacts wirelessly with the tags as soon as the tags are placed in the wireless communication range of the reader. To authenticate or to authorize the tag or the tag reader, or to operate a secure interaction between the tag reader and the tag, at least one secret is shared between the tag reader and the tag. Basically the secret consists of a tag secret stored in the tag (first secret) and a reader secret stored in the tag reader (second secret), whereby the first and the second secret correspond to each other. In the respective authentication and/or authorization process, it is checked whether the reader secret matches with the tag secret or vice versa. This checking is effected by a logic of the authorization system, in general by the reader logic. In the authorization system the secrets are used to implement different levels of security. A first level is implemented using a state of the art challenge-response method between the tag and the tag reader. A second level can be based on the coding or the encryption of the communication between the tag and the tag reader, e.g. using a DES algorithm. A third level is related to the access to the data or the applications stored in the tag or in the tag reader. This level is realized using a tag key or an application key stored in the tag, and a reader key stored or derived in the tag reader. According to WO 97/34265 A1 the first secret, e.g. a stamp, and the second secret, e.g. launch data, are subject to the rules of a hierarchical authorization system.

Because of the secret shared by the members of the authorization system, in particular the tag and the tag reader, the authorization system is a closed system. Interaction can only take place between the members sharing the matching secrets.

Other systems are known in which the reader secret is not directly stored in the tag reader but in a device interconnected to the tag reader, e.g. in a subscriber identity module (SIM) realized as a contact tag, and interconnected to the tag reader via electrical contacts. One drawback is the limited interaction rate (speed) because of the contact interface.

From the state of the art further closed authorization systems are known with different configurations of where and how to store the secrets.

WO 2008/034937 A1 discloses a communication system comprising an apparatus and an external device, e.g. a non-contact tag. The apparatus comprises a control unit configured to detect a radio frequency field and to co-operation with a secure module, e.g. a contact smart card, a SIM card or a chip. The secure module is permanently integrated, detachably attached or removably mounted into the apparatus. Depending on whether the apparatus acts as a tag reader (active mode) or as a tag (passive mode), the control unit controls the non-contact communication or passes the control over to the secure module.

EP 1 873 963 A1 relates to an authentication method for integrated circuit cards (IC cards) in an authentication system between a first IC card, e.g. a secure application module (SAM) of a terminal, and a second contact IC card interconnected through a terminal by means of corresponding secrets stored in the first and second IC card. In particular, at least one identification and/or authentication number is used to authenticate the first IC card from the second IC card.

US 2005/0103839 A1 discloses a closed authorization system with three devices: a terminal, a security module, e.g. an IC card, and an physically separated identification and authorization unit (IAL). In the IAL the information necessary for the identification of a user is stored in a memory. This information is comparable to a PIN entered by the user in a system realized without an IAL. The IAL is used to make obsolete the entering of a PIN. The interaction between the terminal and the IC card is either a contact or a non-contact interaction, the interaction between the IC card and the IAL is wireless.

WO 2006/117009 A1 discloses a method of managing a peripheral unit, e.g. a memory card, of a terminal in a communication network by a secure unit, e.g. a subscriber identity unit (SIM card). Implemented is an architecture in which the operation of the memory card is enabled only in the presence of the SIM card, which is capable of authenticating the memory card. Because of the trusted functionality of the SIM card, the memory card becomes a second trusted unit controlled by the SIM card. Not enabled is a modification of the secret stored in the secure unit independent from the second secret itself.

US 2008/0076475 A1 discloses a mobile system including a SIM card and a communication circuit. The communication circuit interacts with an external device, in particular a tag reader, through a first wireless interface, and with the SIM card through a second wireless interface. Provided are a system and a SIM card with a plurality of different communication interfaces or communication protocols. Not enabled is a modification of the secret stored in the tag reader.

In a closed-state of the art authorization system (hereafter referred to as standard authorization system or standard system), the secret, in particular the reader secret, is stored in the tag reader, either in a logic, in a memory or in a further tag logically connected to the tag reader, e.g. a subscriber identity module. If the reader secret has to be modified, then the logic, the memory, or the further tag has to be replaced. Such a change of hardware of the tag reader is cumbersome and may be difficult to realize. Furthermore, because of the trusted functionality of the reader secret, such changes may not be wanted at all. That is why the tag reader is often designed in a way that does not allow easy access or replacement of the hardware or hardware parts in which the reader secret is stored. Due to these drawbacks, the tag readers of a standard system cannot be easily modified or updated to interact with tags of another standard system.

SUMMARY

It is an object of the present invention to overcome at least some of the drawbacks of the prior art. In particular, it is an object of the present invention to provide an enhanced authorization system which is compatible with existing authorization systems (systems in operation, installed systems).

According to the present invention, these objects are achieved particularly through the features of the independent claims. In addition, further advantageous embodiments follow from the dependent claims and the description.

The authorization system comprises a reader for a reader-card interaction with a card, and a logic module configured to assign the reader and the card to each other and to make operable the reader-card interaction based on reader data of the reader and card data of the card, whereby the reader data and the card data are authorization data of the authorization system.

According to the present invention, the above-mentioned objects are particularly achieved in that the logic module is further configured to read via a non-contact interface device data from an authorization storage device, and to assign the reader to the card based on the device data for making operable the reader-card inter-action.

Thus, the present invention discards the approach known from standard authorization systems of replacing the hardware of the tag reader in order to change the reader secret (authorization data) stored in the tag reader. Specifically, the present invention breaks with the common approach of the standard systems of storing modifications of authorization data in the tag reader. In an enhanced authorization system according to the present invention (hereinafter authorization system), rather than in the reader, modifications of authorization data or other information related to a reader (hereafter reader data) are stored in a wireless authorization storage device (ASD) which is wirelessly interconnected with the reader.

Accessing reader data stored in the ASD is possible, if the reader comprises a non-contact interface and the authorization storage device is arranged somewhere within a communication range (interaction range) of the reader. The non-contact interface is used for the non-contact interaction between the reader and the ASD (hereafter reader-device interaction). Either the non-contact interface of the reader is configurable for said interaction or an interface of the ASD (hereafter device interface) is compatible with the non-contact interface. Because of the wireless interconnection or the wireless interaction, respectively, between the reader and the ASD, and particularly when the ASD is realized as a passive device powered by the reader via the wireless connection, a wired connection between the reader and the ASD is not required, neither for the interaction nor for powering the ASD.

This results in enhancements of the authorization system with respect to configuration (setup) of the system, e.g. introduction of new system devices such as a new kind/type of readers or cards; assignment of the different devices of the system to each other; enablement or safeguard of system compatibility, backwards compatibility and retro-fitability; implementation of improved or additional security features; and implementation of new or additional applications.

By introducing the authorization storage device, the authorization system is advanced from a "two element" system (standard system) to a "three element" system. The "two element" system basically comprises the reader and a card, and the major interactions are thus between the reader and the card. The "three element" system in addition comprises the authorization storage device, and the major interactions occur between the reader and the card, and between the reader and the ASD. Relayed (tunneled) by the reader, in the "three element" system, an interaction between the card and the ASD can take place also. From the card's perspective, the interaction between the reader and the ASD may be hidden respectively takes place functionally hidden. As will be described later, a further advantage of the introduction of the ASD are the emerging possibilities to control, or even to make operable, the interaction between the reader and the card, or any other interaction effected or relayed by the reader.

For example, the logic module of the authorization system is implemented as a reader logic, a card logic, or a device logic, configured to handle data, in particular authorization data, or to execute an application, and connected to or arranged in the reader, the card or the authorization storage device, respectively.

The card comprises stored card data and a card interface for a reader-card interaction between the reader and the card. The reader comprises stored reader data and a reader interface for the reader-card interaction, a contact or non-contact reader interface, and a non-contact interface. The authorization storage device comprises stored device data and a device interface for a non-contact interaction. The authorization storage device is wirelessly connected to the reader during a reader-device interaction between the reader and the authorization storage device and/or during a card-device interaction between the card and the authorization storage device, relayed by the reader (and because of the relay depending on the reader-device interaction). The reader-device interaction and the card-device interaction are made operable by the logic module and are implemented via the device interface and the non-contact interface.

In an embodiment the authorization system comprises a peripheral unit and/or a host. The peripheral unit or the host, or both, are logically connected to the reader, and comprise means for a reader-host/unit interaction between the reader and the peripheral unit, respectively the host. Alternatively or additionally, the peripheral unit and/or the host comprise means for a card-host/unit interaction between the card and the peripheral unit, respectively the host, wherein the card-host/unit interaction is relayed by the reader.

In a further embodiment of the authorization system the authorization storage device is arranged spaced apart from the non-contact interface at an essentially fixed distance (with respect to the reader), at least during the reader-device interaction or the card-device interaction, and/or during either one of the interactions performed or relayed by the reader. In still another embodiment the ASD may be arranged at the fixed distance permanently.

In general, the reader data is one part of authorization data used in the authorization system (system data). Reader data is matching unambiguously with data of other devices (members) of the authorization system, such as the card data, which form another part of authorization data. Authorization data is used to assign the different devices of the authorization system, such as the reader, the card or the ASD, to each other or to the authorization system, respectively. Authorization data is also used to assign the application implemented within the authorization system to the authorization system or to the devices of the system, respectively. For example, the application is stored in the reader, the card, the authorization storage device, the peripheral unit and/or the host. Together the different devices belonging to the same authorization system (sharing the system membership or matching system data) encompass the closed authorization system. Assignment to each other is a feature of the authorization system with regards to security, interoperability, re-configurability or retrofitability of the authorization system.

In general, authorization data is handled by the logic module of the authorization system. The logic module comprises a computer program product and a processing unit, e.g. a microprocessor (uP). Authorization data may be handled in one logic module only, e.g. in the reader logic. Alternatively more than one logic module may be used at the same time or subsequently to handle authorization data.

The authorization storage device may be used to store other kind of data (which are not to authorization data) used in the authorization system and handled by the logic module of the authorization system.

Besides for authorization, data may be used for further purposes, such as:
a) To implement the different levels of system security known from the prior art;
b) To make operable an interaction performed or relayed by the reader, in particular a reader-card interaction between the reader and a card, or with another device of the authorization system (in this case the data may be considered system related);
c) To make executable an application, in particular to use the reader for controlling access to or execution of the application stored on the card (in this case the data may be regarded application related).

The same data or derived data may be used to implement either one of the above described objects, or a combination thereof.

The device data stored in the ASD may represent a complete replacement of the reader data or only an amendment (update) of the reader data. One aspect of the invention is to use the authorization storage device to store the reader data, particularly authorization data, that can not be stored in the reader—or that shall not be stored in the reader, e.g. due to considerations to enhance the system security. Accordingly, the logic module is configured to use the device data to alter the reader data for making operable the reader-card interaction. Another aspect of the invention is to use the ASD to store data of other devices of the authorization system, e.g. data related to the peripheral device or data related to special kinds of cards, e.g. a monitoring card. An example of a monitoring card would be a card used to periodically read out information about the interactions performed by the reader, for accounting/licensing purposes.

Storing authorization data in the authorization storage device rather than in the reader makes it possible to change the reader data without having to change the reader hardware. In practice, swapping of reader data is in most cases effected (realized), implemented by a modification of the reader software (substitute software), or by adding and executing an additional (new) or amended application (substitute application). At least a part of the substitute application, when executed, is directed to perform the reader-device interaction. By the substitute software or the substitute application, the reader is configured to interact with the ASD and to handle device data, if applicable. The substitute software is realized by substitution, change, amendment or update of the software that is operating the reader (reader operating software). The software or the application to perform the reader-device interaction comprises commands (including codes, applets, etc.) that are executed by the reader or the reader software in addition to the commands executed with regards to other interactions of the reader.

Within an authorization system software changes, or introduction of new or amended applications, are realizable easier and offer more possibilities than hardware changes. Furthermore, often besides a hardware change also a software change is necessary nevertheless. Therefore, by using the authorization storage according to the invention, a transformation or an advancement of an existing, standard systems is realizable more cost-effectively.

The software or the application to perform the reader-device interaction is provided by a logic module of the authorization system, e.g. the reader logic. Alternatively, the device logic of the authorization storage device is used, provided that a basic interaction between the reader and the ASD takes place based on which the ASD may send to the reader the respective commands that shall be executed by the reader.

A further aspect of the invention is the fact that the authorization storage device is physically separated from the non-contact interface. The physical separation allows a secure placement of the ASD respective a secure spatial set-up of the authorization system. The physical separation is basically unchangeable due to the defined position of the ASD with respect to the reader or the non-contact interface, respectively. To further improve the security of the authorization system, the ASD is configured to become inoperable when removed from the fixed distance. For example, means for effecting the inoperability comprise a power unit for powering a memory of the ASD in which the device data is stored. The power unit itself is wirelessly powered by the reader, e.g. through the RF field which is periodically emitted by the reader when checking for the presence of the card. For example, the power unit is configured to erase the device data, in case the power drops below a predefined threshold. Power drops below the threshold when the power unit is not powered by the reader anymore, e.g. because the ASD has been removed from the fixed distance or the interaction range of the reader.

To improve the security of the authorization system, in an embodiment, the reader is configured to perform a method of verifying the presence of the ASD or an interaction signal from the ASD. The verification is used to diagnose and determine whether the fixed distance between the wireless authorization storage device and the non-contact interface has not been altered in a way affecting the spatial set-up. The logic module is configured to verify that the fixed distance has not been altered.

A further aspect of the physical separation by the fixed distance is the degree of freedom regarding where to install or affix the authorization storage device. In an embodiment of the authorization system, the ASD is affixed onto the reader, in most cases in a way that the ASD is hidden (not visible). If wanted, the ASD may be visible to a user of the reader. If the enclosure of the reader can be easily removed, e.g. to get access to the reader hardware, then the ASD may be placed inside the reader. If the reader enclosure cannot be easily removed, but the complete reader can be removed from e.g. the wall on which the reader is mounted, then the ASD can be fixed on the backside of the reader facing the wall. When the reader cannot be removed from e.g. the wall at all, the ASD can be placed next to the reader, either on the wall side on which the reader is mounted (front), in the wall e.g. in a recess, or even on the other side of the wall (back).

In an embodiment, the authorization storage device is realized in or is embodied as any known kind of physical, non-contact (wireless) data carrier, such as e.g. a card (an additional card), a sticker, a label, an inlay, a tag, a token, a pendant or an integrated circuit (a chip). The ASD may be self-adhesive. To improve security, a self-adhesive ASD is realized in a way that the ASD is physically destroyed, and therefore becomes inoperable, when removed. The physical destruction may be implemented in a way that the device interface is permanently disrupted from a memory of the ASD in which the device data is stored.

In a further embodiment of the authorization system, the authorization storage device or the device data, respectively, is configured to make operable via the respective logic module at least one interaction performed or relayed by the reader. Relaying by the reader means that the reader is used to relay an interaction taking place between devices of the system other than the reader with respect to interaction commands being executed and end-to-end data being exchanged. In general, the ASD is related to one of the following interactions: a) the reader-device interaction; b) the reader-card interaction; c) the device-card interaction; d) the reader-host/unit interaction; e) the card-host/unit interaction; and/or f) the device-host/unit interaction. Alternatively or additionally, the ASD or the device data make executable the application. Alternatively the device data together with at least one of the card data or the reader data is configured accordingly.

From an external point of view (e.g. the point of view of the user of the authorization system, in particular the card user), a further aspect of the invention is to be seen in the fact that the authorization storage device is functionally hidden. Data, such as the reader data, is moved into a stealth authorization storage device (SASD). With regards to e.g. the reader-card interaction, functionally hidden means that for the card or for the application stored in the card, it looks as if all interaction takes place with the reader, although the reader may further interact with the ASD to make operable the reader-card interaction. In particular, it looks as if the card data is matched with the reader data stored in the reader, also in a case in which no matching reader data is stored in the reader and the actual matching data is the device data stored in the ASD.

From an external point of view, the card, or any other device of the authorization system, is interacting solely with the reader, irrespective of whether the matching data required by the reader is effectively the reader data stored in the reader or the device data stored in the ASD, or a combination thereof.

To physically or functionally hide the authorization storage device in the authorization system is a further aspect with regards to the system security or the protection of the system. When data, e.g. device data, is stored in the authorization storage device, it becomes more difficult to hack, to attack, to defeat or to circumvent the system, in particular the reader data. This is particularly the case, if it is not known at all (from an external point of view), that an ASD or SASD is used in the authorization system.

A further embodiment of the authorization system is characterized in that the device data stored in the authorization storage device is used to alter (replace, amend, update) the reader data stored in the reader. The device data is replacing the reader data which have originally been configured and used to make operable one of the interactions performed or relayed by the reader, for example the reader-card interaction.

An aspect of altering data, e.g. reader data, by device data is related to the emerging possibility to enhance (make generic) existing authorization systems, e.g. a standard system, while maintaining the functionality of the existing system. The following example shows how an enhancement is realizable: A first closed authorization system, in which e.g. the system membership is defined by a first empowerment data or empowerment secret, may be enhanced to include a second card with second card data used to define system membership. This is effected by assigning an ASD to the reader of said first system, and to assign the device data stored in the ASD to match the second card data. Thereafter, the device data basically act as the second reader data. The following example shows a further enhancement realization: To include a second closed authorization system, in which the system membership is defined by a second empowerment data or empowerment secret, in a first closed authorization system, the second empowerment data missing in the reader of the first system is stored in the ASD assigned to said reader of the first system. A third example would be: To merge a first and a second closed authorization system to form the authorization system, the first empowerment data missing in the reader of the second system is stored in the first ASD assigned to the second reader, and the second empowerment data missing in the reader of the first system is stored in the second ASD assigned to the first reader.

By means of the authorization storage device or the device data, respectively, authorization systems of a more generic level are realizable in which different authorization systems or different cards are included or merged (different meaning system data, defining the system membership, being different for the system or the respective cards). In particular, the authorization storage is used to make generic the readers of the different system with regards to the reader data or the data of the different system missing (not being stored) in the reader, respectively. Basically, the authorization system according to the invention is imposed on an existing authorizations systems.

From an external point of view, it looks as if e.g. the existing authorization system (standard system) is an integral part of the authorization system; and/or the authorization system was configured (set-up, implemented, installed) to include the existing authorization system. This is important with regards to backwards compatibility or retro-fitability, in case an existing authorization system is to be converted into an authorization system while retaining (safe-guarding) full functionality.

A further aspect of making generic the different authorization system or the (made generic) readers of the different system, respectively, is related to the owners/providers. If data or system membership is related to the owners/providers, then the authorization storage device provides a means for a first owner/provider to get access to and to use the authorization system of another (a second) owner/provider. Owner/provider may refer to the owner/provider of different systems, the owner/provider of different cards, or even the owner/provider of different applications.

In an embodiment of the authorization system, the authorization storage device, the device data, or the device data together with at least one of the card data or the reader data, is used—by means of at least one respective logic module configured accordingly—to make operable a second authorization system, a second card, or a second application of a second owner/provider based on a second system data, or a group thereof, in a first authorization system of a first owner/provider based on a first system data.

In a further embodiment of the authorization system, the logic module is configured to use the authorization storage device or the device data to secure at least one of the interaction performed or relayed by the reader, preferably at least the reader-card interaction. Alternatively or additionally, the logic module is configured to use the authorization storage device or the device data to secure the execution of the application. Alternatively, the security is effected by the authorization storage device or the device data in combination with at least one of the reader data and the card data.

In another embodiment of the authorization system, the logic module is configured to use the authorization storage device or the device data to enforce (establish) the authorization system membership of a device of the authorization system, such as the card or the reader. Additionally or alternatively, the logic module is configured to use the device data to enforce a rule of an authorization system, preferably a hierarchical authorization system. In a further embodiment, the device data, together (i.e. in combination) with the card data and/or the reader data, is configured accordingly, or the authorization storage device is used solely. (Establishing includes respective verification or enforcement)

In a further embodiment of the authorization system, the reader comprises only a single interface for the reader-card interaction and the reader-device interaction. The non-contact reader interface acts as (is) the non-contact interface. This is possible when the reader-card interaction and the reader-device interaction are based on the same protocol and use the same frequency. This is basically the case when the authorization storage device is realized as a further card of the authorization system. Alternatively, the reader interface is configured to perform both the reader-card interaction and the reader-device interaction, either subsequently or at the same time. Configuration may be effected once for several interactions, once for all future interactions, or for each single interaction.

The invention further relates to a method of operating (making operable) an interaction in an authorization system according to the invention. The method comprises the steps of a) Initiating a reader-card interaction between a reader and a card;
b) Optionally, initiating a reader-host/unit interaction between the reader and at least one of a peripheral unit or a host;
c) Initiating a reader-device interaction between the reader and an authorization storage device;
d) Using the authorization storage device, a device data stored in the authorization storage device, or the device data in combination with at least one of a reader data stored in the reader or a card data stored in the card, or a combination thereof, to define an empowerment data;
e) Using the empowerment data to make operable at least one of the interactions or the execution of an application, or a combination thereof, performed or relayed by the reader.

Particularly, the present invention relates to a method of assigning in an authorization system a reader and a card to each other, based on reader data and card data used as authorization data of the authorization system. The method comprises the steps of reading by a logic module the device data from an authorization storage device via a non-contact interface of the reader, and using the device data to assign the reader to the card, thereby making operable at least a reader-card interaction between the reader and the card.

The initial set-up of the authorization system comprises the following steps:

a) Assigning the authorization storage device to the reader, e.g. this is effected by assigning the device data to the reader data, or by defining that the device data replace the reader data and shall be used instead;
b) Modifying the software of the reader or the application stored in the reader, or both;
c) Placing the authorization storage device within an interaction range of the reader and spaced apart from the non-contact interface at an essentially fixed distance.

The invention further covers a computer program product for use in an authorization system. The computer program product comprises computer readable program code embodied in a computer readable medium. The authorization system comprises a reader with reader data, a card with card data and an authorization storage device with device data. The authorization system further comprises a logic module configured to assign the reader and the card to each other and to make operable a reader-card interaction between the reader and the card. The reader-card interaction is based on the reader data and the card data, wherein the reader data and the card data are authorization data of the authorization system. The computer program product comprises instructions to cause the logic module to read via a non-contact interface of the reader the device data from the authorization storage device, and to assign the reader to the card based on the device data, and thereby make operable the reader-card interaction.

The further embodiments described above with reference to the authorization system are applicable in the same way to the method of operating the interaction in the authorization system, respectively the method of assigning in the authorization system the reader and the card to each other, and to the computer program product.

The term card is to be understood to cover a plurality of cards (a card population, a card inventory). In the cards the same application or different applications (multi-application cards) may be stored. The cards as well as the applications may be provided by the same or by different, independent owners/providers of the cards or owners/providers of the application, respectively. The term card includes all different physical embodiments known to realize a portable data carrier as well as a virtualized card, e.g. a card simulated on a PDA. The terms reader and authorization storage device are to be understood similar to the term card.

The term data, in particular reader data, card data and device data, covers all the different data used and handled in the authorization system and is not limited to authorization data. Data also covers data derived from data in a logic module of the authorization system.

Examples of data are:
i) Identification data to identify a device or the application, effected by means of a serial number, a unique or safe identification number—or an application identifier;
ii) Operational data used in the authorization system, including authorization data.
iii) Security data. Security data may be considered to be a subset of the operational data;
iv) Application data.

The term application is to be understood broadly and includes at least application data and application code. The term application further refers to a single application or multiple applications, provided by either the same or different application owners/providers. Multiple applications may be completely independent from one another or from the different applications owners/providers, respectively, or they may depend on or interact with each other.

The term making operable (make executable) covers all data handling and interactions that have to be performed in the authorization system for having an interaction enabled, controlled, altered, amended or updated, or for having an application executed or making an application executable, respectively.

The term rule of an authorization system is to be understood as any kind of data used to define and enforce relationship between the different devices of the authorization system and/or the applications. All the rules together define what is allowed with regards to the interaction between the devices or with regards to the execution of the application, or both. In a hierarchical authorization system, the rules are further related and/or depend on the hierarchical levels. The hierarchical levels are used to further bar the data by defining the interaction possibilities between the different hierarchical levels.

BRIEF DESCRIPTION OF THE DRAWINGS

The present invention will be explained in more detail, by way of example, with reference to the drawing. The description and the drawings should not be considered to limit the invention as defined in the claims.

DETAILED DESCRIPTION OF THE EMBODIMENTS

Figure 1:
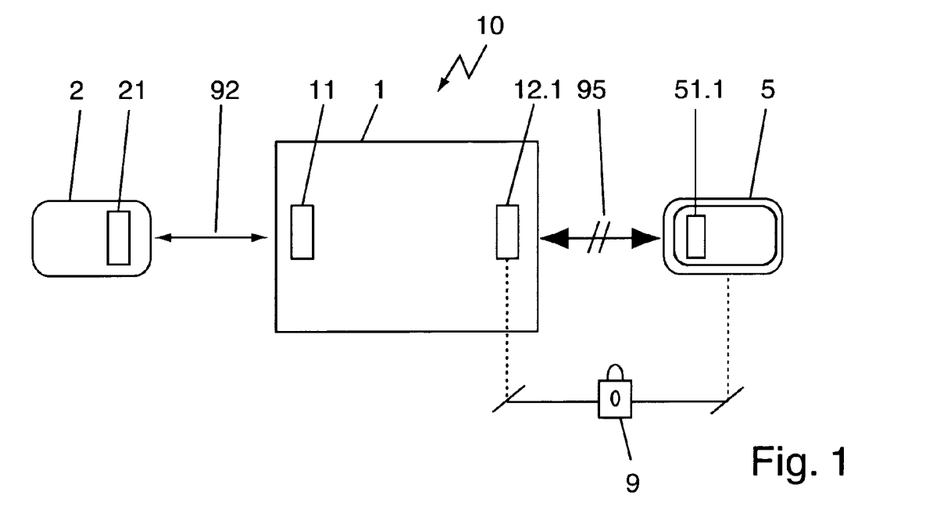
FIG. 1 shows an authorization system according to the invention with a card, a reader, and a wireless authorization storage device.

FIG. 1 shows an authorization system 10 according to the present invention. The authorization system 10 comprises a reader 1, a card 2, a wireless authorization storage device (ASD) 5 and a logic module of the authorization system 10 (see FIG. 7). The reader 1 comprises a reader interface 11 for a reader-card interaction 92 with the card 2 and a non-contact interface 12.1 for a non-contact reader-device interaction 95 between the reader 1 and the ASD 5, as well as further means needed for an interaction such as e.g. a reader memory 14 or a reader logic 13 to be used as the logic module (see FIG. 7). The card 2 and the ASD 5 comprise a card interface 21 or a device interface 51.1, respectively, for the interaction with the reader 1. The card 2 may be either a non-contact card 2.1 or a contact card 2.2 (see FIG. 7). Accordingly the reader-card interaction 92 is either a non-contact interaction 92.1 (wireless or contactless interaction) or a contact respectively wired interaction 92.2 (see FIG. 7). The ASD 5 is arranged spaced apart from the non-contact interface 12.1 at an essentially fixed distance 9, at least during the reader-device interaction 95. The fixed distance 9 defines an invariable displacement between the ASD 5 and the non-contact interface 12.1, realized by the spatial set-up of the authorization system 10, in particular the position of the ASD 5 in relation to the non-contact interface 12.1. Once the ASD 5 has been finally placed in the interaction range of the reader 1, the ASD 5 is in general immovable with respect to the non-contact interface 12.1. Accordingly the ASD 5 is also arranged spaced apart from the non-contact interface 12.1 at the fixed distance 9 during the reader-card interaction 92. Examples of spatial set-up are: the ASD 5 is permanently installed next to the reader 1; the ASD 5 is affixed onto the reader 1 e.g. the reader outside; or the ASD 5 is placed inside the reader.

In the authorization system 10, the authorization storage device 5 is configured to make operable at least one interaction performed or relayed by the reader 1, in particular the reader-card interaction 92. In more detail, the logic module of the authorization system 10, e.g. the reader logic 13, is configured to use or to interact with the ASD 5 accordingly, in particular to read data via the non-contact interface 12.1 from the ASD 5, and to assign the reader 1 to the card 2 to make operable the reader-card interaction 92 (see FIG. 7). The logic module comprises a computer program product (with corresponding instructions) for controlling a processing unit.

The fixed distance 9 is chosen within the wireless interaction range of the non-contact interns face 12.1. The fixed distance 9 is preferably realized in a secure way, at least in normal operation. In a secure way means that a manipulation of the ASD 5, or an access to the ASD 5 by a card user or the owner/provider of the authorization system 10, is not possible without a change of the hardware of the reader 1 or the spatial set-up of the authorization system 10. Further spatial set-ups of the system may be realized using a displaced antenna comprising the non-contact interface 12.1, wherein the displaced antenna is arranged remote from an enclosure of the reader 1 comprising the reader interface 11.

Further means or methods may be implemented to verify that the fixed distance 9 has not been altered, such as e.g. a verification of presence of the ASD 5 or a verification of interaction signal of the ASD 5. Said verification of presence may be realized by a periodical interaction between the reader 1 and the ASD 5; e.g. the reader 1 reads at least the unique identification number (UID) of the ASD 5 periodically. The verification of the interaction signal may be realized by analyzing whether the signal of the ASD 5 complies with certain threshold values, either predefined upon set-up or defined on an ongoing basic. The thresholds can be related to the interaction signal output level, or the differences between the interaction signal output level (peak) and the interaction sidebands.

Figure 2:
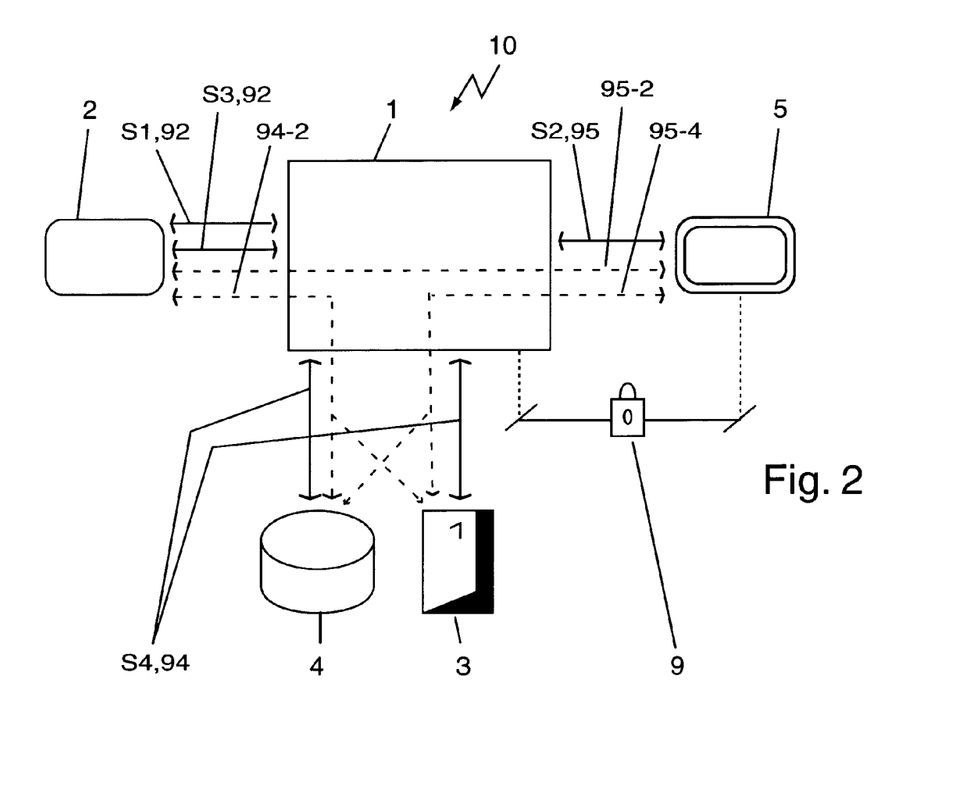
FIG. 2 shows a sequence of interaction step in an authorization system according to the invention.
Figure 7:
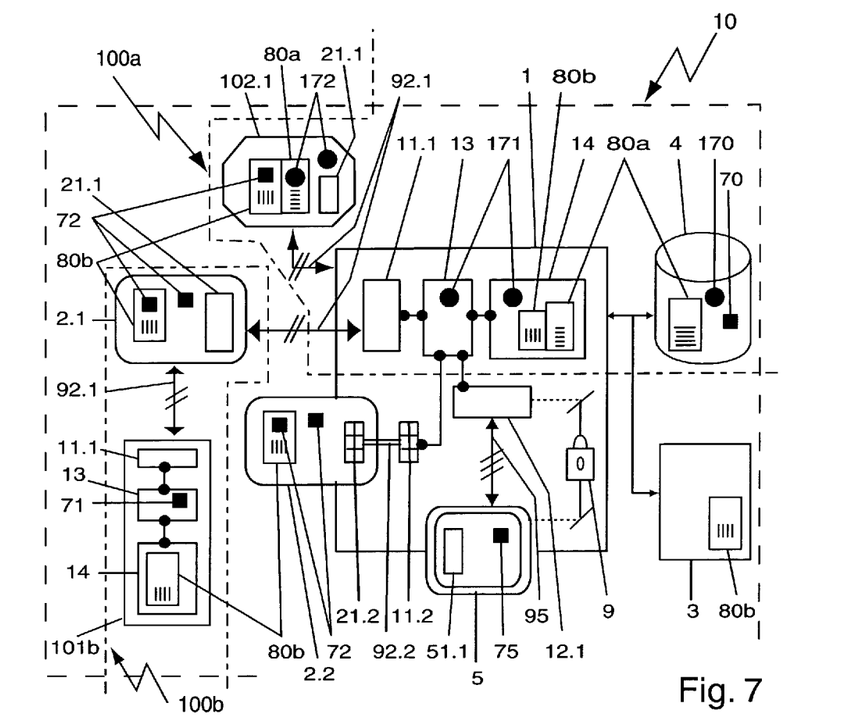
FIG. 7 shows in detail an authorization system according to the invention.

FIG. 2 shows the authorization system 10 with the reader 1, the card 2, the wireless authorization storage device 5, a peripheral unit 3 and a host 4. Within the authorization system 10 the following basic interactions are possible: the reader-card interaction 92 between the reader 1 and the card 2; the reader-device interaction 95 between the reader 1 and the ASD 5; and a reader-host/unit interaction 94 between the reader 1 and the host 4 and/or the peripheral unit 3. In a reader driven authorization system, in which the reader 1 is the active device and initiates the interaction with the card 2 and the ASD 5, and, therefore, the card 2 and the ASD 5 are passive devices, basically the following interaction steps take place:

a) Step S1: the reader 1 initiates the reader-card interaction 92 by asking for a reply from the card 2.

b) Step S2: the reader 1 checks by the reader-device interaction 95 for the presence of the ASD 5. If an ASD is present, the reader 1 interacts 95 with the ASD 5 to get authorization data, in particular device data 75 (see to FIG. 7), which is missing by the reader 1 or the card 2 and which is needed in the authorization or authentication process, e.g. to finally initiate or to make operable the reader-card interaction 92. This is e.g. the case when the card 2 is present and is recognized by the reader 1 by reading the card's UID, but the reader 1 is not able to further interact with the card 2, because card data 72 stored in the card 2 does not match reader data 71 stored in the reader 1 (see to FIG. 7).

c) Step S3: the reader 1 interacts with the card 2, e.g. to execute an application 80 (see FIG. 7).

d) Step S4: the reader 1 interacts with the peripheral unit 3 or the host 4 with respect to the application 80.

This interaction sequence is symbolically abbreviated (S1, S3[S2], S4), because Step S3 depends on Step S2, or Step S3 is made operable by Step S2, respectively.

With regards to the order of the interaction steps, other sequences are possible:

a) (S1[S2], S3, S4): Steps S2/S1-Step S3-Step S4, whereby Step S1 depends on Step S2; This means that the reader 1 first checks for the presence of an ASD 5. If an ASD 5 is present, the reader 1 tries to initiate the reader-card interaction 92 with the card 2 based on the device data 75 received from the ASD 5.

b) (S1, S3, S4[S3]): Step S1-Step S3-Steps S2/S4, whereby Step S4 depends on Step S2.

Also combinations of these sequences are possible, e.g. (S1 [S2], S3[53], S4[S2]), whereby Step S2 is performed once or several times to enable, control or update Steps S1, S2 and S4.

Figure 3:
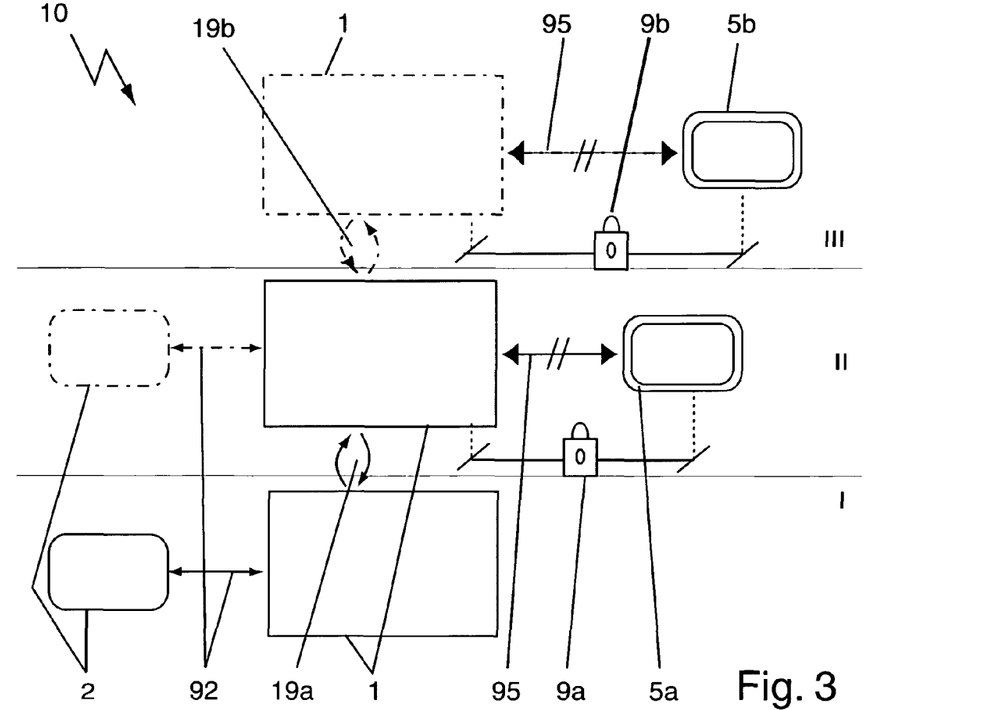
FIG. 3 shows an authorization system according to the invention with a mobile reader.

FIG. 3 shows the authorization system 10 according to the invention with the reader 1, the card 2, and two authorization storage devices 5a, 5b. In a first configuration I the reader 1 interacts 92 with the card 2. Then the reader 1 is dislocated by a first dislocation 19a into a second configuration II. In the second configuration II the reader 1, respectively the non-contact interface 12.1 (refer to FIG. 7), is located spaced apart from the first ASD 5a at the first fixed distance 9a during the reader-device interaction 95. In the configuration II the reader 1 may interact 92 with the card 2 or other cards. By a second dislocation 19b the reader 1 is moved into a third configuration III in which the reader 1 is arranged spaced apart from the second ASD 5b by the second fixed distance 9b during a next reader-device interaction 95. This embodiment shows how in each configuration the spatial set-up between the reader 1 and the ASD 5a, 5b, if present, is characterized by the fixed distance 9a, 9b, even if the reader 1 changes position.

An example with different configurations would be an access application related to an elevator. On the ground floor, a user presents his card to the reader permanently mounted on the lift to get access to the lift (corresponding to configuration I). In the lift, he would request to get to e.g. the $10^{th}$ floor. Arrived on the $10^{th}$ floor the reader asks the ASD (corresponding to configuration II), based e.g. on the card's UID read by the reader on the ground floor and temporarily stored in the reader, whether the user may effectively access the $10^{th}$ floor. The access application or the effective access by the user, respectively, is subject to a double control: a first control when the reader is reading the card; and a second control based on the reader-device interaction on the $10^{th}$ floor, wherein the reader is enabled to continue or terminate the access application, respectively.

As shown in FIG. 3, the wireless authorization storage device 5 and the reader 1 may be configured only temporarily at the fixed distance 9, depending on the displacement 19 or the actual position of the reader 1 with respect to ASD 5, respectively.

Figure 4:
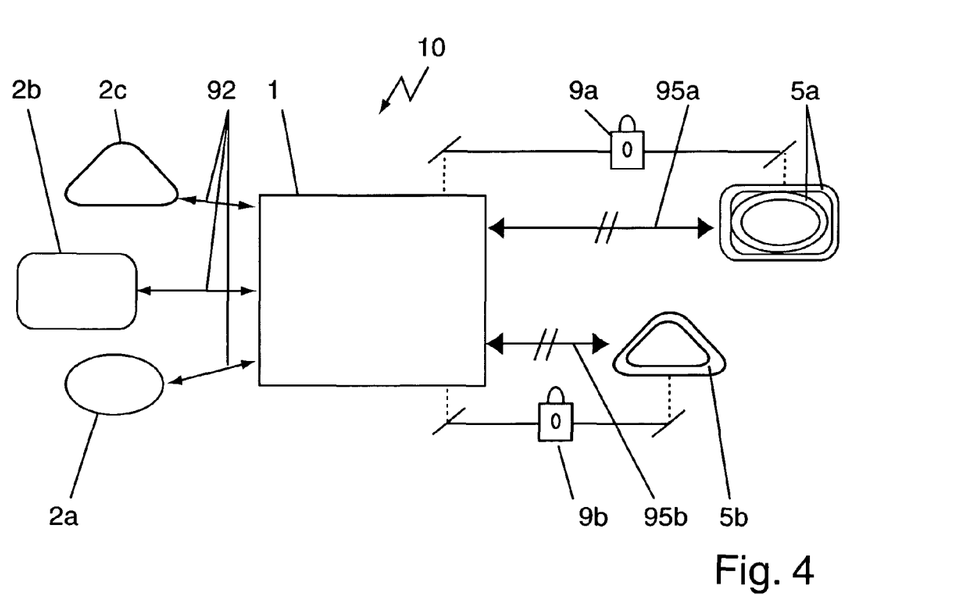
FIG. 4 shows an authorization system according to the invention with several wireless authorization storage devices.

FIG. 4 shows the authorization system 10 according to the invention comprising one reader 1, three cards 2a, 2b, 2c and two wireless authorization storage devices 5a, 5b arranged at the fixed distances 9a, 9b. The first ASD 5a is related to the first and second card 2a, 2b, the second ASD 5b is related to the third card 2c.

The invention allows to use different ASD 5a, 5b, which are added to the authorization system 10 subsequently, to make operable an interaction performed or relayed by the reader 1, e.g. the reader-card interaction 92 with the different cards 2a, 2b, 2c, and wherein the cards 2a, 2b, 2c are added subsequently to the authorization system 10. Use of different ASD 5a, 5b is possible, provided that the reader 1 has anti-collision capabilities or other capabilities to select a single ASD out of a plurality of ASD.

Figure 5:
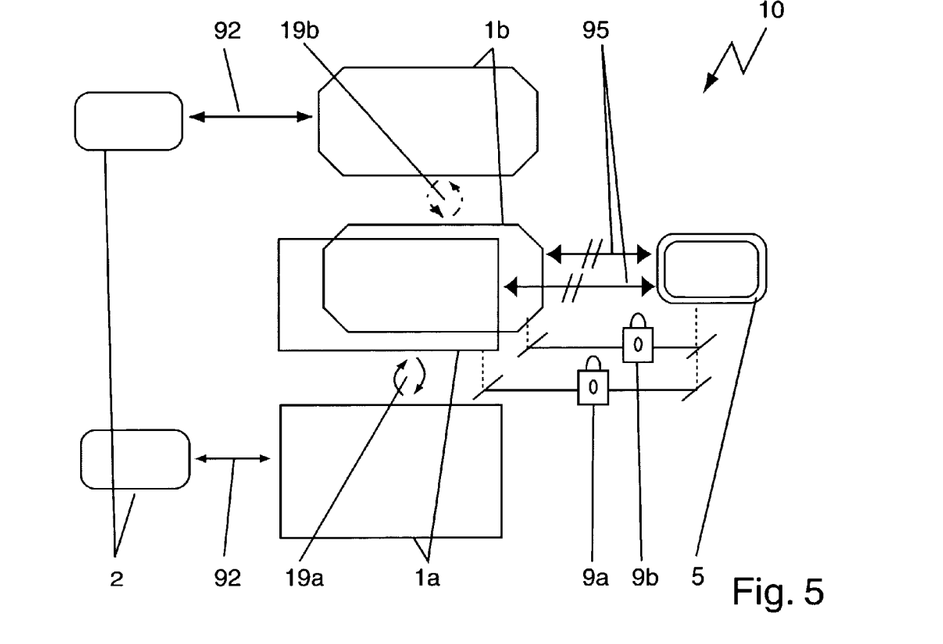
FIG. 5 shows an authorization system according to the invention with two mobile readers.

FIG. 5 shows the authorization system 10 comprising two readers 1a, 1b, the card 2 and the wireless authorization storage device 5. First, the first reader 1a interacts 92 with the card 2. Then, after the first displacement 19a, the first reader 1a interacts 95 with the ASD 5 arranged at the first fixed distance 9a. Later on, the second reader 1b interacts 92 with the card 2, or another card. Still later, after the second displacement 19b, the second reader 1b interacts 95 with the same ASD 5 arranged at the second fixed distance 9b. In this authorization system 10, the ASD 5 is assigned to several different readers 1a, 1b.

An example with such a configuration would be an application to get access to a bank deposit box. The bank safe comprises a plurality of deposit boxes, each comprising the reader, and several box opening locations where the box can be opened, each comprising the ASD. With his bank card, the user may identify himself and remove his deposit box to place it at the box opening location. Only after successful verification of the user and/or the deposit box by the ASD, the user may open the deposit box.

Figure 6:
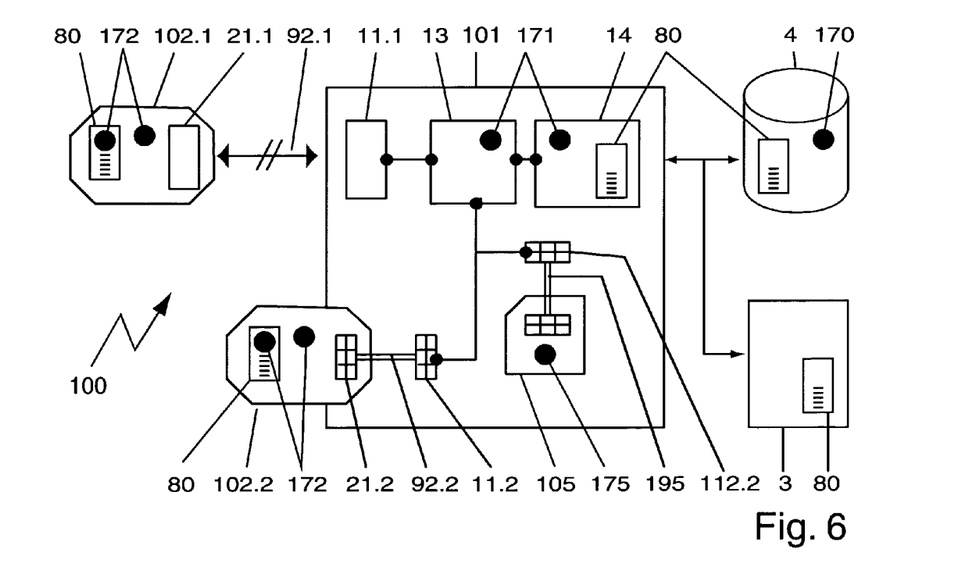
FIG. 6 shows in detail a standard authorization system according to the prior art.

FIG. 6 shows a closed standard authorization system 100 known from the prior art. The standard system 100 comprises a tag reader 101, a non-contact tag 102.1 and a contact tag 102.2. Furthermore the standard system 100 may comprise the peripheral unit 3 and/or the host 4, both connected to the tag reader 101. The tag reader 101 comprises the reader interface 11, the reader logic 13 configured and used as the logic module and logically connected to the reader interface 11, and the memory 14 logically connected to the reader logic 13. The reader interface 11 is either a non-contact reader interface 11.1 for the non-contact interaction 92.1 with the non-contact tag 102.1, or, alternatively or additionally, a contact reader interface 11.2 for the contact interaction 92.2 with the contact tag 102.2.

In the tag reader 101, a reader secret 171 is stored, e.g. in the reader logic 13, in the reader interface 11.1, or in the reader memory 14. Furthermore, the tag reader 101 contains the application 80, e.g. stored in the reader memory 14. In the tag 102, a tag secret 172 and the application 80 are stored. The reader secret 171 and the tag secret 172 correspond to each other and define an empowerment secret 170, e.g. authorization data. Examples of empowerment secrets 170 are access keys, session keys, algorithms, etc., used to mutually assign e.g. the tag 102 and the tag reader 101, or the tag 102 or the tag reader 101, respectively, and the application 80. To initiate the reader-card interaction 92 in a secure way (secure interaction), or to get secure access to the application 80, both the reader secret 171 and the tag secret 172 have to be kept secret. Accordingly, both have to be stored in the tag 102 and the tag reader 101 in a way that they can not be altered, read, deleted, or otherwise changed, at least not without the explicit permission of e.g. the owner/provider of the standard system or the owner/provider of the application 80, respectively. To summarize, the empowerment secret 170 may be related to the closed standard authorization system 100 as such or to the application 80 realized within the standard system 100, or both. In particular, the empowerment secret 170 is configured to make operable the reader-card interaction 92 between the tag 102 and the tag reader 101, and/or the execution of the application 80. Additionally, parts of the secret 170, in general the reader secret 171, or even a host secret, may be stored in the host 4 to improve the security, or for special execution of the application depending on the host presence.

The tag reader 101 may further comprise a reader-module interface 112.2 for a contact reader-module interaction 195 between the reader logic 13 and a secure module 105, such as a subscriber identity module (SIM) or a secure application module (SAM). Generally the secure module 105 is an integral part of the tag reader 101 and permanently connected to the tag reader 101 when the tag reader 101 is initially installed. In the secure module 105, a module secret 175 is stored, which in general is inaccessible and unchangeable. In most cases, the secure module 105 is e.g. realized as a smart card permanently inserted into the tag reader 101. The secure module 105 is interacting with the tag reader 101 via contacts. Therefore, the speed of the contact reader-module interaction 195 is slow compared to a non-contact interaction. Generally, the module secret 175 completely replaces the reader secret 171, that is why in the tag reader 101 no secret is stored. In such a case, the secret empowerment 170 is defined by matching tag secret 171 and module secret 175.

FIG. 7 shows the authorization system 10 according to the invention comprising the reader 1, the non-contact tag 102.1, the non-contact card 2.1, the contact card 2.2 (of the standard system)—in summary, the card 2, the peripheral unit 3, the host 4, and the wireless authorization storage device 5. As known from the prior art, the reader 1 comprises the reader interface 11, the reader logic 13, and the reader memory 14. The reader logic 13 is used as the logic module of the authorization system 10. Not taking into account the ASD 5, the logic module is configured to assign to each other the reader 1 and the card 2 based on corresponding reader data 71 (e.g. the reader secret 171) and card data 72 (e.g. the card secret 172), thereby making operable the reader-card interaction 92 between the reader 1 and the card 2. Thus, the reader-card interaction 92 is based on reader data 71 and card data 72, both being—or belonging to—authorization data of the authorization system 10. Additionally the reader 1 comprises the non-contact interface 12.1 for the reader-device interaction 95 with the ASD 5. The card 2 and the ASD 5 comprise the card interface 21 and a card memory, and the device interface 51.1 and a device memory, respectively. Both may further comprise a card logic and a device logic, respectively, to handle data. The logic module is configured to read device data 75 from the ASD 5, as the reader-device interaction 95 or as part of said interaction. The logic module is further configured to assign the reader 1 to the card 2 for making operable the reader-card interaction 92 based on the device data 75, in particular by using the device data 75 to replace, or to update or amend, the reader data 71. The ADS 5 is arranged spaced apart from the non-contact interface 12.1 at the fixed distance 9. The reader interface 11 may be configured as a non-contact reader interface 11.1 for the non-contact reader-card interaction 92.1 between the reader 1 and the non-contact card 2.1 or the non-contact tag 102.1, and—alternatively or additionally—as a contact reader interface 11.2 for the contact reader-card interaction 92.2 of the reader 1 with the contact card 2.2. The non-contact reader interface 11.1 for the non-contact reader-card interaction 92.1 may function as the non-contact interface 12.1 for the reader-device interaction 95. Furthermore, stored are in the reader 1 the reader secret 171, and in the non-contact tag 102.1 the tag secret 172, as known from the prior art. In the reader 1 and in the non-contact tag 102.1, also the application 80 is stored, particularly a first application 80a related to the standard authorization system 100. In the non-contact card 2.1 and the contact card 2.2, the card data 72 and the application 80 are stored, particularly a second application 80b related to the authorization system 10. The second application 80b may be also stored in the reader 1. The card data 72 basically matches the reader data 71 generally stored in the reader 1 of the authorization system 10. Together, the card data 72 and the reader data 71 are used to form or to define empowerment data 70, in particular by using the device data 75 to alter (replace, update, amend) the reader data 71. The empowerment data 70 is basically comparable with the empowerment secret 170 and can be used to implement the same functions such as e.g. authorization methods or procedures. The empowerment data 70 is used by the logic module to make operable at least the reader-card interaction 92. In case that in the authorization system 10 no reader data 71 is stored in the reader 1—which is the case for the reader 1 shown in FIG. 7—, or the reader data 71 is not assigned to the card data 72, the card data 72 and the device data 75 stored in the ASD 5 are assigned to each other to be used as empowerment data 70. In case that in the authorization system 10 the reader data 71 stored in the reader 1 is incomplete, e.g. the reader data 71 does not give access to a certain application 80 stored on the card 2 or the reader data 71 is related to an older version of the authorization data than the card data 72, the device data 75 is used to alter the reader data 71. In this case, the card data 72, the reader data 71, and the device data 75 stored in the ASD 5 are assigned to each other to be used as empowerment data 70. In the authorization system 10, the empowerment data 70 is configured to make operable at least one interaction performed or relayed by the reader 1, e.g. the reader-card interaction 92, the reader-host/unit interaction 94 or the reader-device interaction 95. Alternatively or additionally, the empowerment data 70 is configured to make executable or to execute the second application 80b. Basically, in the authorization system 10 according to the invention the device data 75 is configured to alter (replace, update, amend) the reader data 71. From a functional point of view, at least with regards to making operable the reader-card interaction 92, the device data 75, at least in part, is used to alter the reader data 71, or act as the reader data 71, respectively. The logic module is configured accordingly.

Furthermore the empowerment data 70 can be used by the logic module of the authorization system 10 to make operable either interaction which is performed or relayed by the reader 1 and which shall depend on the ASD 5 or the device data 75, e.g. also a card-host/unit interaction 94-2 between the card 2 and the peripheral unit 3 or the host 4, respectively, a device-card interaction 95-2 between the ASD 5 and the card 2, or a device-host/unit interaction 95-4 between the ASD 5 and the peripheral unit 3/host 4. Alternatively or additionally, the empowerment data 70 can be configured to secure interactions. The empowerment data 70, particularly the device data 75, is used as an additional security feature or security level. Furthermore, the empowerment data 70 can be configured to securely access the second application 80b (secure access) or to securely execute the second application 80b (secure execution).

The device data 75 stored in the ASD 5, or the ASD 5 as such, is assigned to the reader 1. Therefore, the reader 1 is able to interact with the ASD 5, or vice versa, with regards to the empowerment data 70 which is either related to the authorization system 10 as such (system related), or which is related to the application 80 realized within the authorization system 10 (application related), or both.

Enabling the logic module to perform the reader-device interaction 95 according to the invention is basically implemented by a modification of the reader software or the application 80 executed by the reader. Modification covers a partial or complete change (replacement, update, amendment) of the reader software. E.g. the following may be modified: the operating system, operational data, applets, settings, parameters, algorithms or functions. When the ASD 5 is used with regards to the application 80, then also the application 80 has to be modified in a way that the application 80 can be executed by the reader 1, either by the original, un-modified reader software or the modified reader software.

The reader 1 may be configured for the non-contact reader-card interaction 92.1 via the reader interface 11.1 using a first frequency, and for the non-contact reader-device interaction 95 via the non-contact interface 12.1 using a second frequency or the first frequency. Using two physical interfaces or two frequencies, the reader-card interaction 92.1 and the reader-device interaction 95 may occur even simultaneously.

The reader interface 11.1 and non-contact interface 12.1 may be realized as a single entity or even a single interface, e.g. an interface with only one antenna, using the same or different frequencies.

The reader 1 may be further configured to use a first protocol (for coding, communication) for the non-contact reader-card interaction 92.1 via the reader interface 11.1 and to use a second protocol, or the first protocol, for the non-contact reader-device interaction 95 via the non-contact interface 12.1. Using two different protocols, the reader-card interaction 92.1 and the reader-device interaction 95 may occur simultaneously. Depending on the reader 1 with regards to the interaction protocols, several combinations of which protocols are used for which interaction are possible. A first combination may be that the protocol for the reader-card interaction 92.1 with the tag 102.1 or the card 2.1 differs from the protocol for the reader-device interaction 95. In a second combination, the protocol for the reader-card interaction 92.1 with the card 2.1 is the same as the protocol for the reader-device interaction 95, and differs from the protocol for the reader-card interaction 92.1 with the tag 102.1.

Using the same frequencies and the same protocol for the reader-card interaction 92.1 and the reader-device interaction 95, there is basically no difference between these two interactions. For the reader 1—from an interaction point of view—the authorization storage device 5 is nothing but a further non contact card 2.1 or a further non-contact tag 102.1.

The following system shows how the authorization storage device 5 is used to enhance, or to make generic authorization systems, in particular to switch the first closed authorization system 100a comprising the tag 102 and the tag reader 101 into the authorization system 10 which additionally comprises the card 2. In the first closed authorization system 100a, the system membership is defined by the empowerment secret 170, particularly the reader secret 171 and the tag secret 172. Accordingly, the tag reader 101 is not able to interact 95 with the card 2 that does not contain the tag secret 172. Assigning the ASD 5 with the device data 75 to the tag reader 101, or vice versa, and using the device data 75 as the reader data 71 to form the empowerment data 70, the tag reader 101 is reconfigured to become the reader 1. Thereafter, the reader 1 is able to interact 92 with the card 2. The ASD 5 is used to transform the tag reader 101 into the reader 1, wherein the reader 1 is of a more generic level than the tag reader 101. The first closed authorization system 100a becomes a part of the (enhanced, upgraded, made generic) authorization system 10.

The more generic level of the authorization system 10 materializes in the enhanced interaction capabilities which allow to merge the first closed authorization system 100a and a second closed authorization system 100b comprising the card 2 into a single authorization system 10. In particular, the second closed authorization system 100b comprises the non-contact card 2.1 and a second reader (tag reader) 101b. The second tag reader 101b comprises the reader interface 11.1, the reader logic 13 in which the reader data 71 is stored, and the memory 14 in which the second application 80b is stored. For the second closed authorization system 100b, the system membership is defined by or derived from the empowerment data 70, in particular the card data 72 and the reader data 71.

The transformation of the tag reader 101 into the reader 1 is realized without any changes of the hardware of the tag reader 101. All that needs to be done is to place the wireless authorization storage device 5 within the interaction range of the tag reader 101 and to assign the ASD 5 to the tag reader 101 (to become the reader 1), or vice versa. The assignment of the ASD 5 and the reader 1 can be realized by the modification of the software of the tag reader 101 or the software executed by the reader 1, respectively. Alternatively or additionally, the application 80, in particular the second application 80b, executed by the reader 1 has to be modified. Because the application 80 is basically also only a piece of software, modifying the application 80 is as easy as to adopt the reader software.

If it is possible to store the second application 80b as a further application in the tag 102.1, e.g. by means of the reader secret 171 and the card secret 172, the authorization storage device 5 can further be used to upgrade the first closed authorization system 100a, comprising the tag 102.1 and the tag reader 101, to include the second application 80b, which is basically controlled by the secret 70, particularly the card data 72 and the reader data 71 of the second closed system 100b. In the upgraded first closed system 100a (now being the enhanced authorization system), the access to the second application 80b is effected by using the reader secret 171 to access the tag 102.1 with the tag secret 172, and by using the empowerment data 70 acting as, simulating or replacing the reader data 71, to access and/or to execute the second application 80b.

Based on FIG. 7 the sequence (S1, S3[S2], S4) of FIG. 2 shall be described in more detail: first the reader 1 sends out an authentication signal and performs anti-collision, as long as needed to get the reply from the card 2, e.g. the card's UID, to identify the card 2 (Step S1). Based on the said identification, the reader 1 knows what kind of interaction 92 shall be established, e.g. a secure non-contact reader-card interaction according to ISO/IEC 14443 or a proprietary protocol. In case the reader 1 has all the empowerment data 70 necessary to establish the secure interaction, e.g. because reader data 71 is stored in the reader 1, the reader 1 initiates the secure interaction. This scenario corresponds to the sequence known from the prior art (Step S3). In case the reader 1 lacks certain or all empowerment data 70, the missing empowerment data 70 are retrieved—by means of the logic module configured accordingly—from the authorization storage device 5. Therefore, the reader 1 interacts 95 with the ASD 5. Interaction 95 may include reading the device data 75 and assigning the device data 75 and the card data 72 to the reader logic 13 for making operable the reader-card interaction 92, or for executing the application 80. Interaction 95 may also include handing over the card data 72 to the ASD 5. The device logic now acts as the logic module for handling—the card data 72 together with the device data 75 to enable the reader-card interaction 92, or to execute the application 80. In case the device logic is handling the empowerment data 70, basically a device-card interaction 95-2 is established. The reader 1 is basically acting as an interaction relay and is only used to relay (to tunnel) the interaction between the ASD 5 and the card 2. E.g. the ASD 5 codes the individual commands of the reader-card interaction 92 (the commands that shall be sent by the reader 1 to the card 2) and sends these commands to the reader 1 using a first coding, e.g. a proprietary protocol or atomic instructions. Based on the commands received from the ASD 5, the reader 1 interacts 92 with the card 2, either also using the first coding or, after translation in the reader 1, using a second coding, e.g. a standardized protocol such as ISO/IEC 14443 or NFC. Analogously, the reader 1 sends (tunnels) to the ASD 5, with or without translation of the coding, the answers sent from the card 2 to the reader 1, for further data handling by the ASD 5 and subsequent device-card interacting 95-2, if to be effected.

From a point of view of the card user, only the reader-card interaction 92 is going on, similar to the prior art Step S3, although the reader-card interaction 92 is made operable by the ASD 5, or the device data 75, and, therefore, depends on Step S2 (Step S3[S2]).

If appropriate, e.g. to execute the application 80 on the peripheral unit 3 by reading application data from the peripheral unit 3 or by writing application data into the peripheral unit 3, the reader-host/unit interaction 94 takes place during or after the device-card interaction 95-2 or the reader-card interaction 92 (Step S4).

Depending on whether the reader logic 13, the card logic or the device logic, or even a logic of the peripheral unit 3 and/or the host 4 is used as the logic module of the authorization system 10 to handle the empowerment data 70, in particular the device data 75, several other sequence scenarios are possible. E.g. the ASD 5 can be used to make operable the device-card interaction 95-2 or the device-host/unit interaction 95-4.

The wireless authorization storage device 5 allows to realize an authorization system 10 of a more generic level. From a point of view of the card user or the application 80 stored on the card 2, in the authorization system 10, the card user always gets the impression that the card 2 is interacting 92 only with the reader 1, and in particular that all reader data 71 is stored solely in the reader 1. For the card user, in particular the user of the non-contact card 2.1 (with card data 72), there is no difference between the second closed authorization system 100b, comprising the card 2.1 and the second tag reader 101b (with reader data 71), and the authorization system 10, based on the first closed authorization system 100b and comprising the tag 102.1 (with tag secret 172) and the tag reader 101 (with reader secret 171) and being enhanced according to the invention.

Figure 8:
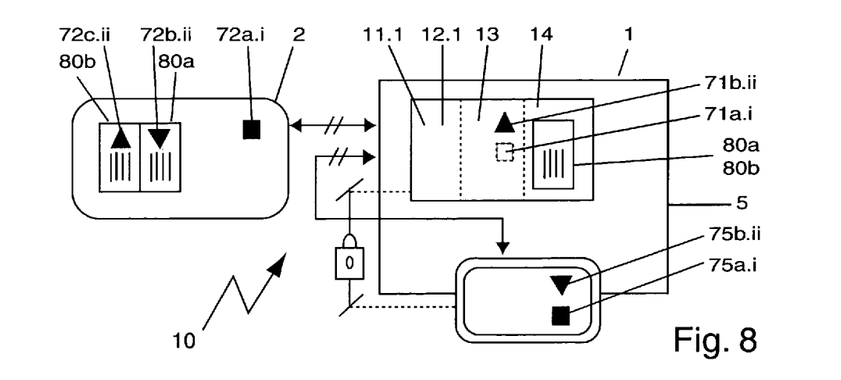
FIG. 8 shows a further detail of an authorization system according to the invention.

FIG. 8 shows how in the authorization system 10 the wireless authorization storage device 5 is used to update the reader 1 with respect to the missing empowerment data 70. Missing empowerment data 70 may be data which has not been stored in the reader 1 when it was originally installed or introduced in the authorization system, but which is needed when new cards (with new applications) or new applications (stored on existing card) are added to the authorization system later on.

The reader 1 comprises a single component integrating the non-contact reader interface 11.1, the non-contact interface 12.1, the logic 13, and the memory 14. The reader interface 11.1 and the non-contact interface 12.1 are realized as a single functional unit (electronic component), or a sub-group of the component. Stored in the card 2 are the first card data 72a.i, the first application 80a associated with the second card data 72b.ii, and the second application 80b associated with the third card data 72c.ii. The first card data 72a.i is related to the authorization system 10 (system related). The second and third card data 72b.ii, 72c.ii are related to the applications 80a, 80b (application related). Either one or both of the system related data or the application related data may be used to implement the rules of an authorization system. In the reader 1, the second reader data 71b.ii is stored. The first reader data 71a.i is missing and instead is realized by means of the ASD 5 as the first device data 75a.i. Accordingly, from a functional point of view regarding the authorization, the first reader data 71a.i and the first device data 75a.i are identical. Further, in the ASD 5 the second device data 75b.ii is stored. The first reader data 71a.i or the first device data 75a.i, respectively, is system related. The second reader data 71b.ii and the second device data 75b.ii are both application related. Because the first reader data 71a.i is missing, the reader-card interaction 92 can only take place when the ASD 5 is present. To execute the first application 80a stored on the card 2, the first device data 75a.i stored in the ASD 5 is needed to get access onto the card 2, and the second reader data 75b.ii stored in the reader 1 is needed to get access to the second application 80.b. To execute the second application 80b, once again the first device data 75a.i is needed to get access to the card 2, and the second reader data 75b.ii stored in the ASD 5 is needed to get access to the first application 80b.

Figure 9:
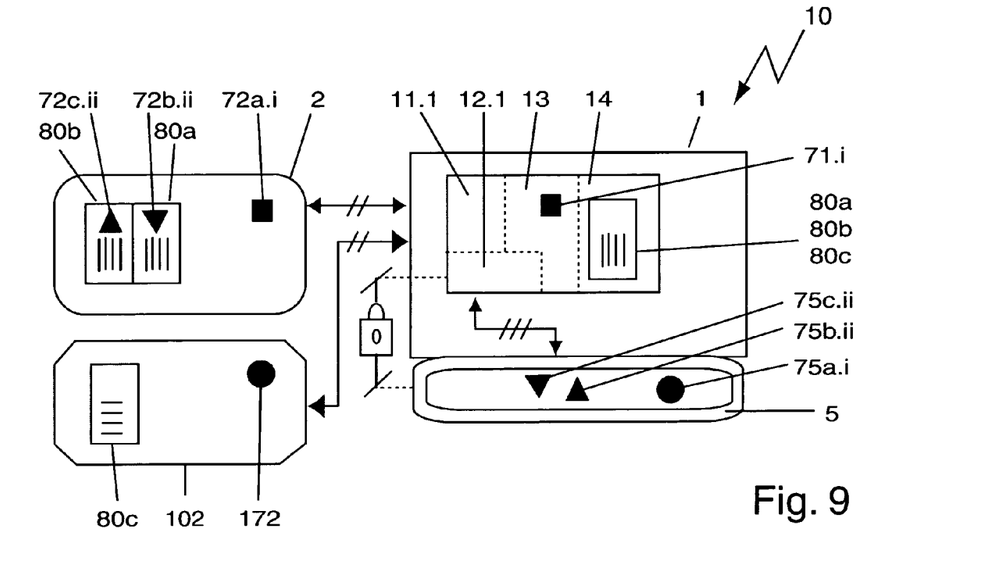
FIG. 9 shows another detail of an authorization system according to the invention.

FIG. 9 shows the card 2 with the first card data 72a.i being system related, with the second and third card data 72b.ii and 72c.ii being related to the first or the second application 80a, 80b, respectively. Furthermore the authorization system 10 comprises the tag 102 with the tag secret 172 and the third application 80c. The reader 1 comprises the reader data 71.i, being system related, and the ASD 5, attached to the outside of the reader 1. In the ASD 5 the first, second and third device data 75a.i, 75b.ii, 75c.ii are stored. The first device data 75a.i is system related, and basically corresponds to the tag secret 171 missing in the reader 1 and is related to the tag secret 172. The second and third device data 75b.ii, 75c.ii are application related. The first device data 75a.i of the ASD 5 enables the reader 1 to interact 92 with the tag 102 and to execute the third application 80c. The second and third device data 75b.ii, 75c.ii, which are related to the second and third card data 72b.ii, 72c.ii of the first and second applications 80a, 80b, enable the reader 1 to access and execute said applications 80a, 80b.

This embodiment shows how the wireless authorization storage device 5 is used to make generic the reader 1 with regards to the cards and/or the applications. By the ASD the reader 1 is enabled to interact with the card, and to get access to the card (us such) or to access the card to execute an application. Furthermore, it shows how the application related device data 75.ii may be used to increase the overall security of the authorization system 10 with respect to the applications which can be executed, or the access to the application. In addition to the reader data 71, the remote data 75 can be used as a further level of security with regards to the applications 80 stored on the card 2.

The reader 1 comprises a single component integrating the non-contact reader interface 11.1, the non-contact interface 12.1, the logic 13, and the memory 14. The reader interface 11.1 and the non-contact interface 12.1 are realized or embodied as two functional units, or sub-groups of the component.

Figure 10:
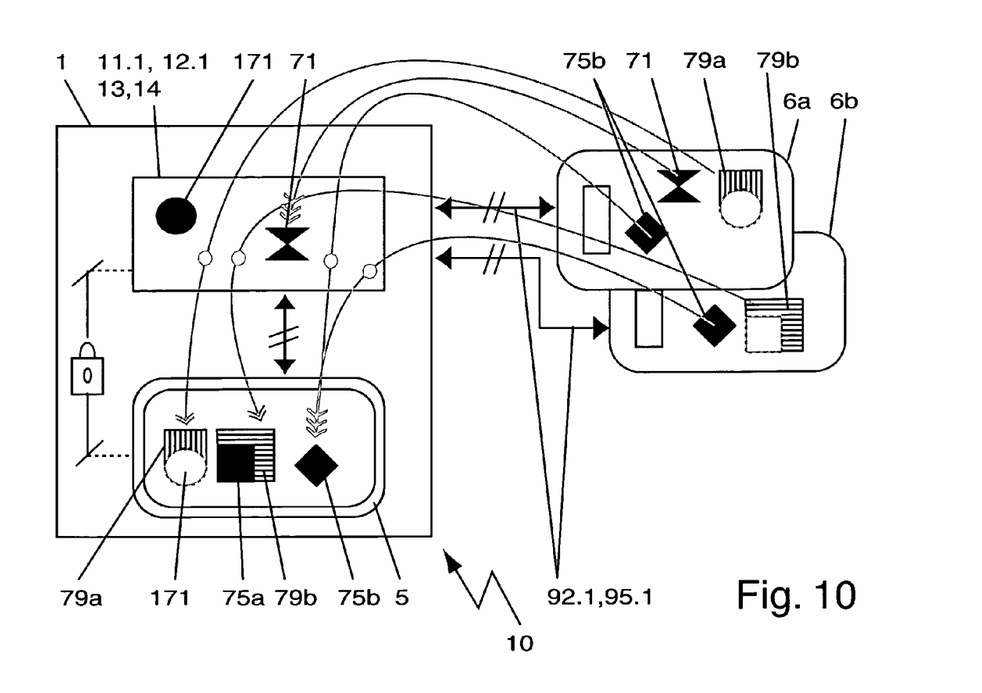
FIG. 10 shows an authorization system according to the invention and a transfer token.

FIG. 10 shows the use of a transfer token 6 for transferring and loading, or storing, respectively, the device data 75 or an update data 79 in the wireless authorization storage device 5 or in the reader 1. The transfer token 6 can be used to store tag secrets, e.g. the tag secret 171, and reader data, e.g. the reader data 71, in the reader 1 (see triple headed light gray arrow). The transfer token can be used to store device data, e.g. the second device data 75b (see triple headed light gray arrow), and update data, e.g. the first and second update data 79a, 79b (see double headed light gray arrow), in the ASD 5. The first update data 79a is related to the tag secret 171 and is configured to amend or update the tag secret 171, wherein the tag secret 171 has been stored in the reader 1 already prior to the load of the update data 79a from the first transfer token 6a. The second update data 79b is related to the first device data 75a and is configured to amend or update said first device data 75a. The first device data 75a has been stored in the ASD 5, before the transfer of the second update data 79b from the second transfer token 6b. The second device data 75b is basically identical to the first reader data 71a missing in the reader 1. In the example given, the second device data 75b is stored on the first and second transfer token 6a, 6b and can be transferred into the ASD 5 from either one of these two transfer tokens (see triple headed light gray arrow). Each transfer token 6 comprises a token interface 61.1 (not shown)

for a non-contact interaction between the token 6 and the reader 1, either using the reader interface 11.1 or the non-contact interface 12.1. Using the reader interface 11.1, the token 6 is handled by the reader 1 like a further card (and a reader-card interaction 92.1), using the non-contact interface 12.1 like a further ASD 5 (and a reader-device interaction 95). FIG. 10 shows how the transfer token 6 can be used to amend or update the ASD 5, in particular the device data 75 (or even the update data 79) stored in the ASD 5. The transfer token 6 can be used to omit replacing (changing) the ASD 5, or to omit adding additional wireless authorization storage devices assigned to the reader 1, in case the ASD 5 has to be amended or updated.

REFERENCE NUMERALS

- 10 authorization system
- 1 reader
- 2 card
- 3 peripheral unit
- 4 host
- 5 authorization storage device, ASD
- 6 transfer token
- 9 fixed distance
- 11 reader interface
- 12.1 non-contact interface
- 13 reader logic
- 14 reader memory
- 19 dislocation
- 21 card interface
- 51.1 device interface
- 61.1 token interface
- 70 empowerment data
- 71 reader data
- 72 card data
- 75 device data
- 79 update data
- 80 application
- 90 interaction
- 92 reader-card interaction
- 94 reader-host/unit interaction
- 94-2 card-host/unit interaction
- 95 reader-device interaction
- 95-2 device-card interaction
- 95-4 device-host/unit interaction
- 100 closed authorization system
- 101 tag reader
- 102 tag
- 105 secure module
- 112.1 module-reader interface
- 170 empowerment secret
- 171 reader secret
- 172 tag secret
- 175 module secret
- 195 reader-module interaction
- . . . 1 non-contact
- . . . 2 contact
- . . . a, .b, .c, . . . first, second, third, . . .
- . . . .i system related
- . . . .ii application related
- S1, S2, S3, S4 steps

What is claimed is:

1. An authorization system comprising:
    a reader configured for a reader-card interaction with a card;
    a logic module arranged in the reader and configured to assign the reader and the card to each other and to make operable the reader-card interaction based on reader data of stored in the reader and card data stored in the card, the reader data and the card data being authorization data of the authorization system;
wherein
    the logic module is further configured to read via a non-contact interface device data from an authorization storage device, and to use the device data as an addition to the reader data stored in the reader with empowerment data missing in the reader, and to use the addition for making operable the reader-card interaction while the authorization storage device is present within an interaction range of the non-contact interface.

2. The authorization system according to claim 1, wherein the logic module is configured to use the device data to alter the reader data for making operable the reader-card interaction.

3. The authorization system according to claim 1, wherein the logic module is configured to make operable at least one of the following interactions: a reader-device interaction between the reader and the authorization storage device, and a card-device interaction between the card and the authorization storage device relayed by the reader.

4. The authorization according to claim 1, wherein the logic module is configured to execute an application.

5. The authorization system according to claim 1, wherein the authorization storage device is arranged spaced apart from the non-contact interface at an essentially fixed distance.

6. The authorization system according to claim 5, wherein the logic module is configured to verify that the fixed distance has not been altered.

7. The authorization system according to claim 1, wherein the logic module is configured to use the device data to secure one of the reader-card interaction and an execution of an application.

8. The authorization system according to claim 1, wherein the logic module is configured to use the device data to enforce at least one of an authorization system membership of the reader, and a rule of the authorization system, preferably a hierarchical authorization system.

9. The authorization system according to claim 1, wherein the authorization storage device is configured to become inoperable or to erase the device data when being removed from a fixed distance, between the authorization storage device and the non-contact interface, or a reader interaction range.

10. The authorization system according to claim 1, wherein the reader further comprises means for at least one of the following verifications: a verification of presence of the authorization storage device, and a verification of interaction signal of the authorization storage device.

11. The authorization system according to claim 1, wherein the authorization system further comprises at least one of a peripheral unit and a host connected to the reader, and the logic module is configured to assign the reader to the peripheral unit or the host to make operable at least one of a reader-host/unit interaction between the reader and the peripheral unit or the host, a card-host/unit interaction between the card and the peripheral unit or the host and a device-host/unit interaction between the authorization storage device and the peripheral unit or the host.

12. The authorization system according to claim 1, wherein a reader interface of the reader used for the reader-card interaction is configured to act as the non-contact interface.

13. A method of assigning in an authorization system a reader and a card to each other based on reader data and card data used as authorization data of the authorization system, comprising the steps of:
  a) reading by a logic module device, arranged in the reader, data from an authorization storage device via a non-contact interface of the reader; and
  b) using the device data as an addition to the reader data stored in the reader with empowerment data missing in the reader, and using the addition for making operable a reader-card interaction between the reader and the card while the authorization storage device is present within an interaction range of the non-contact interface.

14. A computer program product for use in an authorization system, the authorization system having a reader with reader data; a card with card data; a logic module configured to assign the reader and the card to each other and to make operable a reader-card interaction between the reader and the card based on the reader data and the card data, the reader data and the card data being authorization data of the authorization system; and an authorization storage device with device data; wherein
  the computer program product comprises a non-transitory computer-readable storage medium having stored thereon computer-readable instructions for causing the logic module to read via a non-contact interface of the reader the device data from the authorization storage device, and to use the device data as an addition to the reader data stored in the reader with empowerment data missing in the reader, and to use the addition for making operable the reader-card interaction while the authorization storage device is present within an interaction range of the non-contact interface.

15. An authorization system comprising:
  a reader configured for a reader-card interaction with a card;
  a logic module configured to assign the reader and the card to each other and to make operable the reader-card interaction based on reader data stored in the reader and card data stored in the card, the reader data and the card data being authorization data of the authorization system;
wherein
  the logic module is further configured to read via a non-contact interface device data from an authorization storage device, and to use the device data as an addition to the reader data stored in the reader with empowerment data missing in the reader, and to use the addition for making operable the reader-card interaction while the authorization storage device is present within an interaction range of the non-contact interface.

16. A method of assigning in an authorization system a reader and a card to each other based on reader data and card data used as authorization data of the authorization system, comprising the steps of:
  a) reading by a logic module device data from an authorization storage device via a non-contact interface of the reader; and
  b) using the device data as an addition to the reader data stored in the reader with empowerment data missing in the reader, and using the addition for making operable a reader-card interaction between the reader and the card while the authorization storage device is present within an interaction range of the non-contact interface.

* * * * *